United States Patent Office 3,402,019
Patented Sept. 17, 1968

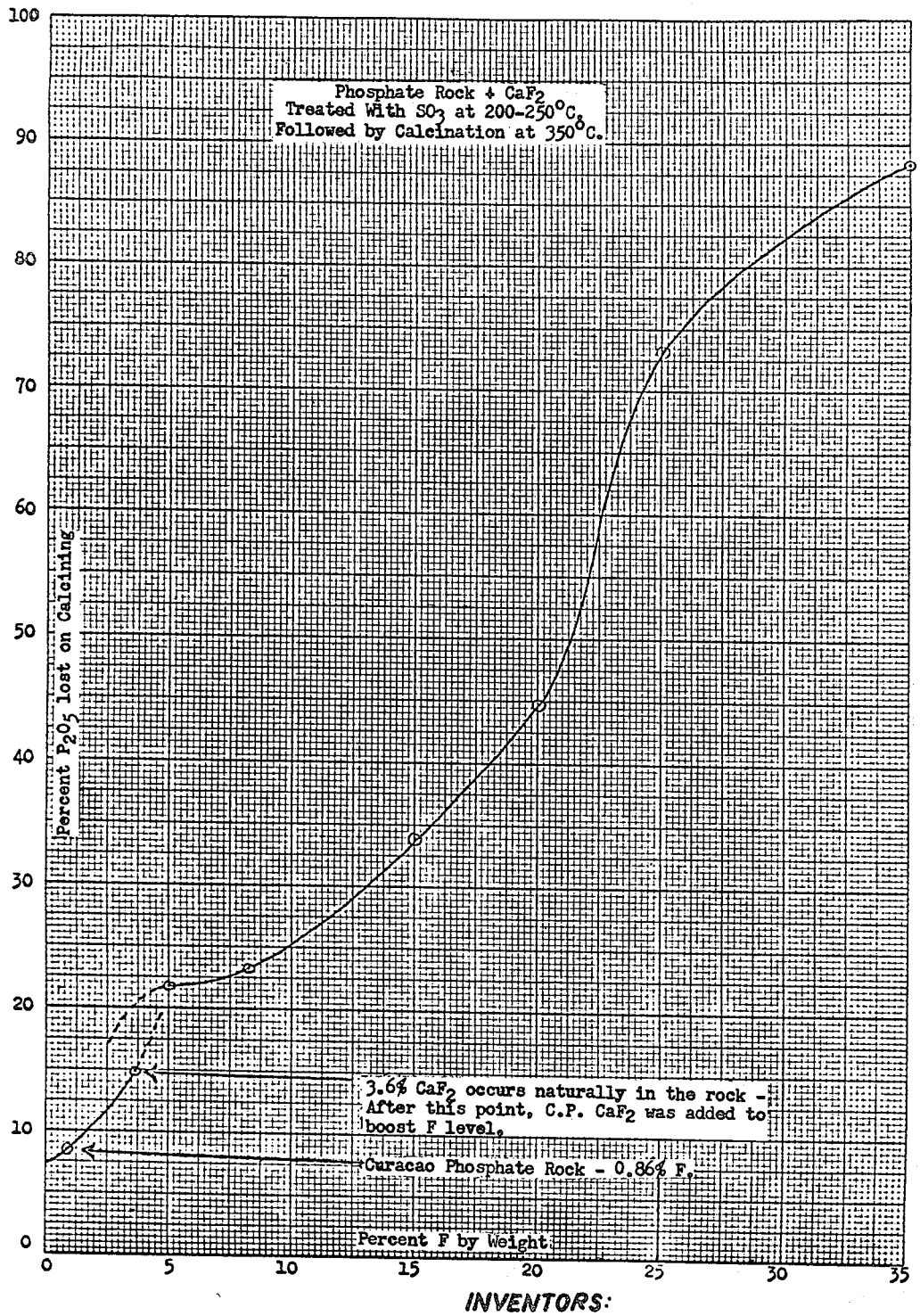

3,402,019
PREPARATION OF PHOSPHORIC ACID, PHOSPHORUS OXYFLUORIDE, AND RELATED COMPOUNDS
Herbert L. Bowkley, Boone, N.C., and Robert B. Thurman, Conley, Ga., assignors, by mesne assignments, to Armour Agricultural Chemical Company, a corporation of Delaware
Filed Nov. 18, 1965, Ser. No. 508,538
10 Claims. (Cl. 23—165)

ABSTRACT OF THE DISCLOSURE

Phosphate rock and a metal fluoride are reacted with $SO_3$ at a temperature of at least 200° C. and a volatilized gaseous product is recovered as phosphorus oxyfluoride. The non-volatilized product may be calcined to remove additional volatilized gases and the gaseous products are then hydrolyzed to produce $H_3PO_4$.

---

This invention relates to the preparation of phosphoric acid, phosphorus oxyfluoride, and related compounds, and more particularly to volatilized reaction products of phosphate rock and calcium fluoride and other metal fluoride mixtures with $SO_3$.

Commercial preparation of phosphoric acid by the electric furnace process involves the reaction of phosphate rock with silica and carbon in an electric arc furnace, and the phosphorus produced is then reacted with air to yield phosphorus pentoxide from which phosphoric acid is prepared by dilution, the phosphoric acid being of high purity.

In contrast, phosphoric acid is also produced by the "wet process" method involving reacting phosphate rock with aqueous sulfuric acid, separating the reaction products, and concentrating the resultant phosphoric acid to the desired level. While the phosphoric acid produced by the latter method is produced at lower cost, the final product always contains many impurities which are solubilized and carried over from the acidulation, and such acid is usable only where purity is not an important criterion.

We have discovered another method by which phosphoric acid of high purity can be prepared via a chemical process but without the high cost of the electric furnace process. We have discovered that when a mixture of phosphate rock and calcium fluoride is reacted with sulfuric anhydride at relatively low temperatures such as, for example, about 200–600° C., 90% or more of the phosphorus content may be recovered from the reaction bed and the reaction mixture recovered from the volatilized material. The volatilized product is found to be phosphorus oxyfluoride, and such a gaseous product is valuable per se. Further, from the volatilized material we may recover high purity phosphoric acid, hydrofluoric acid, and in instances where a silicon-containing compound is present, silicon tetrafluoride, etc.

A primary object, therefore, of this invention is to provide a volatilized gaseous reaction product in the form of phosphorus oxyfluoride. Another object is to prepare from phosphate rock, calcium fluoride, and $SO_3$, a volatilized reaction product and to recover therefrom phosphoric acid and hydrofluoric acid. Other specific objects and advantages will appear as the specification proceeds.

In one embodiment of our invention, a mixture of phosphate rock and calcium fluoride is reacted with sulfuric anhydride at about 200–250° C. in a closed vessel, and after the reaction is completed, the volatile phosphorus compounds are recovered, including phosphorus oxyfluoride as the major component. The compound, phosphorus oxyfluoride, is useful as a product for employment as a reactant with aliphatic amines, aromatic amines, $NH_3$, etc., to form useful products. Phosphoric acid may be recovered from the phosphorus oxyfluoride and in purified form by various process steps. For example, the vented gaseous reaction products may be contacted with spray in a spray tower and the resulting solution then boiled to hydrolyze the product to orthophosphoric acid and hydrofluoric acid. Lime may be added to precipitate the hydrofluoric acid and the purified phosphoric acid recovered by decantation, etc.

If desired, the volatilized gaseous reaction products may be hydrolyzed in any suitable manner and the resulting solution then contacted with steam for removing the hydrogen fluoride, thus providing a recovery separately of purified phosphoric acid and hydrofluoric acid.

We prefer to treat the phosphorus oxyfluoride gas by directing the gas into a tower using live steam so that in a single operation the phosphorus is hydrolyzed to orthophosphoric acid and the hydrogen fluoride is removed separately.

The phosphorus oxyfluoride recovered in the reaction of the rock and calcium fluoride mixture with $SO_3$ has a high phosphorus content, comprising about 30 percent phosphorus. On a $P_2O_5$ basis, this amounts to approximately 68% $P_2O_5$. Starting with such a high $P_2O_5$ content reaction product, it is possible to employ many processes for hydrolyzing the phosphorus oxyfluoride to a desired phosphoric acid product while also removing the impurities therefrom, with the result that the phosphoric acid is of high purity comparable with that obtained from the electric furnace process.

While we do not know for certain the exact mechanism of phosphorus removal from the phosphate rock and calcium fluoride mixture, we believe that the reaction mechanism is first through the reaction of $SO_3$ with the tricalcium phosphate portion of the phosphate rock apatite structure. An adduct type of compound appears to be formed which places the phosphorus-containing portion in an activated form. The general reaction

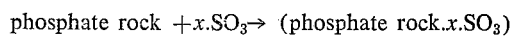

phosphate rock $+x.SO_3 \rightarrow$ (phosphate rock.$x.SO_3$)

may be used to express the adduct formation.

A second step in the mechanism is the reaction of the adduct with $CaF_2$ to yield the product:

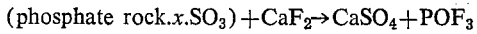

(phosphate rock.$x.SO_3$)$+CaF_2 \rightarrow CaSO_4+POF_3$

Evidence of the extent of reaction is determined by the 1:1 mole ratio of $Ca^{++}$ to $SO_4^{--}$ found in the bed residue after reaction and by vapor pressure measurements and infrared analyses of the gaseous reaction product, $POF_3$.

We have found that the degree to which phosphorus can be recovered as a volatile compound from the reaction mixture is dependent on the $CaF_2$ content of the mixture. In the accompanying drawing, the curve illustrates this dependency. The curve is plotted from the results obtained when phosphate rock and calcium fluoride are treated with $SO_3$ at 200–250° C., followed by calcination at 350° C. As indicated on the drawing, 3.6% of calcium fluoride occurs naturally in the rock, and after this point chemically pure calcium fluoride was added to increase the fluorine level.

We have found that it is the fluorine content of the calcium fluoride compound which is significant in the forming of the volatilized phosphorus product. A substantial amount of volatilized phosphorus product is obtained where the fluorine is 5.0 percent by weight, but the amount of volatilized phosphorus is greatly increased where the fluorine content is as high as 35 weight percent.

Instead of employing calcium fluoride, other metal fluorides may be used, such as, for example, $BaF_2$, $AlF_3$, $MgF_2$, $CaSiF_6$, $Na_2SiF_6$, etc. The reactions may be carried out at atmospheric pressure as well as under superatmospheric pressures.

Specific examples illustrative of our process or important steps thereof may be set out as follows:

EXAMPLE I

Phosphate rock of the following composition was employed in the following laboratory experiment.

*Phosphate rock analysis, total percent*

| | |
|---|---|
| $P_2O_5$ | 31.5 |
| CaO | 44.0 |
| F | 3.59 |
| Fe | 0.73 |
| Al | 1.6 |
| Mg | 0.19 |

156.63 grams of a rock-$CaF_2$ mixture containing 5.0% F was reacted with $SO_3$, at a 1:1 CaO to $SO_3$ ratio, in the Parr autoclave at 200–230° C. for several hours. Initially the pressure rose. However, at 200–230° C. the pressure began to decline and reached equilibrium at about 45 p.s.i.g. The autoclave was then cooled to about 50° C. and vented to the atmosphere, after which it was swept with dry air until cool enough to be opened. The reaction product weighed 329.79 g. 21.8 g. of the reaction product was then calcined at 350° C. for two hours. The calcined reaction product weighed 14.70 g., equivalent to 222.37 g. on a total material balance basis. Analyses of the various stages of the experiment are given in Table I.

TABLE I.—EFFECT OF $CaF_2$ ON PHOSPHORUS VALUE VOLATILIZATION

| | Weight, g. | | Percent of Total Volatilized | |
|---|---|---|---|---|
| | $P_2O_5$ | F | $P_2O_5$ | F |
| Original charge | 48.56 | 7.83 | | |
| Reaction product | 42.64 | 3.56 | 12.2 | 54.5 |
| Calcined product | 38.09 | 0.0 | 21.6 | 100 |

$Ca^{++}/SO_4^=$ Mole ratio of calcined product=1.04.

EXAMPLE II 89.85 grams of a rock-$CaF_2$ mixture containing 24.58% F was reacted with $SO_3$ in the same manner as described in Example I, with the same reaction conditions observed. Analyses of the various stages of this experiment are given in Table II.

TABLE II.—EFFECT OF $CaF_2$ ON PHOSPHORUS VALUE VOLATILIZATION

| | Weight, g. | | Percent of Total Volatilized | |
|---|---|---|---|---|
| | $P_2O_5$ | F | $P_2O_5$ | F |
| Original charge | 14.96 | 22.08 | | |
| Reaction product | 9.67 | 9.42 | 35.4 | 57.3 |
| Calcined product | 3.93 | 2.97 | 73.7 | 86.5 |

$Ca^{++}/SO_4^=$ Mole ratio of calcined product=0.97.

EXAMPLE III 90.54 grams of a rock-$CaF_2$ mixture containing 35.04% F was reacted in the previously described manner. The reaction product weighed 162.62 g. 66.52 g. of the reaction product was then calcined as before, yielding 54.61 g. of calcined product, equivalent of 133.56 g. on a total basis. Results of this experiment are given in Table III.

TABLE III.—EFFECT OF $CaF_2$ ON PHOSPHORUS VALUE VOLATILIZATION

| | Weight, g. | | Percent of Total Volatilized | |
|---|---|---|---|---|
| | $P_2O_5$ | F | $P_2O_5$ | F |
| Original charge | 9.32 | 31.72 | | |
| Reaction product | 5.82 | 9.32 | 37.6 | 70.6 |
| Calcined product | 1.07 | 5.54 | 88.5 | 82.5 |

$Ca^{++}/SO_4^=$ Mole ratio of calcined product=1.07.

EXAMPLE IV 44.11 grams of a mixture of Fischer Scientific Co. Certified Reagent tricalcium phosphate and $CaF_2$ containing 20.06% F were reacted in the manner described for the rock-$CaF_2$ mixtures. The reaction product weighed 68.40 g. 37.16 g. of the product was calcined to yield 34.48 g., equivalent to 63.47 g. on a total basis. Results are given in Table IV.

TABLE IV.—EFFECT OF $CaF_2$ ON PHOSPHORUS VALUE VOLATILIZATION

| | Weight, g. | | Percent of Total Volatilized | |
|---|---|---|---|---|
| | $P_2O_5$ | F | $P_2O_5$ | F |
| Original charge | 11.17 | 8.85 | | |
| Reaction product | 7.33 | 3.84 | 34.4 | 56.6 |
| Calcined product | 6.02 | 1.72 | 53.9 | 60.5 |

$Ca^{++}/SO_4^=$ Mole ratio of calcined product=1.12.

EXAMPLE V

The volatilized reaction product of Example II was passed through water spray from a spray tower to form a solution. The solution was boiled to hydrolyse the acid and form orthophosphoric acid and hydrofluoric acid. Lime was added to precipitate the hydrofluoric acid as fluoride, and the supernatant phosphoric acid was recovered as high purity phosphoric acid.

EXAMPLE VI

The volatilized reaction product of Example III was contacted with water in a scrubber to form a solution and the solution was contacted with live steam to remove the fluorine and provide a purified phosphoric acid product.

EXAMPLE VII

The volatilized reaction product of Example IV was contacted with live steam in a tower, with the result that orthophosphoric acid was recovered at the base of the tower while the fluoride was separated by the stripping action of the steam.

While a substantial amount of the phosphorus compound is obtained in the initial reaction between phosphate rock, calcium fluoride and sulfuric anhydride, we prefer to calcine the solid reaction product in order to recover an additional amount of phosphorus in the total volatilized product, and in the reaction step we prefer to employ a temperature in the range of about 300–600° C., the preferred temperature being about 350° C.

The foregoing process provides a relatively inexpensive method for the preparation of phosphoric acid of high purity and other phosphorus fluorine chemical compounds and by-products. When used as a method to produce phosphoric acid, it eliminates many of the objectionable features of the present electric furnace process and wet process systems.

While in the foregoing specification we have set out specific procedure in considerable detail for the purpose of illustrating embodiments of our invention, it will be understood that such details may be varied widely by those skilled in the art without departing from the spirit of our invention.

We claim:

1. In a process for the preparation of phosphorus oxyfluoride, the steps of reacting phosphate rock and a metal fluoride with $SO_3$ at a temperature of about at least 200° C. and recovering the volatilized gaseous phosphorus oxyfluoride.

2. The process of claim 1 in which the temperature is in the range of about 200–600° C.

3. The process of claim 2 in which the fluorine content of the metal fluoride is at least 5.0 weight percent.

4. In a process for the preparation of phosphorus oxyfluoride, the steps of reacting phosphate rock and calcium fluoride with $SO_3$ at a temperature of about 200–250° C. in a closed vessel, venting the vessel and recovering the volatilized gases, calcining the non-volatilized product in said vessel to remove additional volatilized gases, and combining the volatilized gases from said reaction and said calcining steps.

5. In a process for the preparation of phosphorus oxyfluoride, the steps of reacting phosphate rock and calcium fluoride having a fluorine content of about 5–50 weight percent with $SO_3$ at a temperature of about 200–600° C. in a closed vessel, and venting and recovering the volatilized reaction product.

6. The process of claim 1 in which the volatilized gases are contacted with water to form a solution.

7. The process of claim 6 in which the solution of gases in water is treated to separate fluorine from the phosphoric acid.

8. In a process for the preparation of phosphoric acid, the steps of reacting phosphate rock and calcium fluoride with $SO_3$ at a temperature of about 200–600° C. in a closed vessel, venting the closed vessel and recovering the volatilized gaseous reaction product, calcining the non-volatilized residue to remove additional volatilized gas, and hydrolyzing the gaseous reaction products from said reaction and said calcining operation to form a phophoric acid product.

9. The process of claim 8 in which the hyrolyzed product is treated to separate hydrofluoric acid from the phosphoric acid.

10. The process of claim 4 in which the temperature range in the calcining step is about 300–600° C.

References Cited
UNITED STATES PATENTS

| | | | |
|---|---|---|---|
| 2,712,494 | 7/1955 | Dupont | 23—203 |
| 2,801,904 | 8/1957 | Muetterties | 23—203 |

OTHER REFERENCES

G. Montel, Soc. Chim. France, bulletin, vol. 19, pp. 379–82 (1952).

Hayuk et al., Chem. Abstracts, vol. 50, p. 3133g (April 1956).

OSCAR R. VERTIZ, *Primary Examiner.*

A. J. GREIF, *Assistant Examiner.*